US009924265B2

(12) United States Patent
Lopez Meyer et al.

(10) Patent No.: US 9,924,265 B2
(45) Date of Patent: Mar. 20, 2018

(54) SYSTEM FOR VOICE CAPTURE VIA NASAL VIBRATION SENSING

(71) Applicant: Intel Corporation, Santa Clara, CA (US)

(72) Inventors: Paulo Lopez Meyer, Tlaquepaque (MX); Hector A. Cordourier Maruri, Guadalajara (MX); Julio C. Zamora Esquivel, Zapopan (MX); Alejandro Ibarra Von Borstel, Zapopan (MX); Jose R. Camacho Perez, Guadalajara Jalisco (MX)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/854,927

(22) Filed: Sep. 15, 2015

(65) Prior Publication Data
US 2017/0078788 A1    Mar. 16, 2017

(51) Int. Cl.
*H04R 1/46* (2006.01)
*H04R 25/00* (2006.01)
(Continued)

(52) U.S. Cl.
CPC ............ *H04R 1/46* (2013.01); *H04M 1/6041* (2013.01); *H04R 1/028* (2013.01); *H04R 25/606* (2013.01);
(Continued)

(58) Field of Classification Search
CPC ...... H04R 1/1075; H04R 1/46; H04R 25/604; H04R 25/606; H04R 2460/13;
(Continued)

(56) References Cited

U.S. PATENT DOCUMENTS 1,823,228 A * 9/1931 Apfel .............. G02C 11/06
351/158
1,897,833 A * 2/1933 Benway .......... G02C 11/06
381/151
(Continued)

FOREIGN PATENT DOCUMENTS

KR    10-2011-0068579 A    6/2011
KR    10-2012-0080852 A    7/2012
(Continued)

OTHER PUBLICATIONS

Hakansson et al., "Resonance Frequencies of the Human Skull in Vivo Department of Applied Electronics", Chalmers University of Technology, Gothenburg, Sweden, Nov. 12, 1993.
(Continued)

*Primary Examiner* — Joshua Kaufman
(74) *Attorney, Agent, or Firm* — Grossman Tucker Perreault and Pfleger, PLLC

(57) ABSTRACT

A voice capture system worn by a user senses vibrations through the nose of the user when the user speaks. The voice capture system generates an electronic signal based on the sensed vibration and generate voice data based on the electronic signal. In this manner, the system may capture a user's voice while also screening out external noise (e.g., based on the sound dampening properties of the human skull). In one example, a voice capture system may include a wearable frame (e.g., eyeglass frame) on which is mounted at least one sensor and a device. The at least one sensor senses vibration in the nose of a user and generates the electronic signal based on the vibration. The device receives the electronic signal from the at least one sensor and generates voice data based on the electronic signal.

16 Claims, 3 Drawing Sheets

(51) Int. Cl.
*H04M 1/60* (2006.01)
*H04R 1/02* (2006.01)
*H04M 1/05* (2006.01)
*H04M 1/725* (2006.01)

(52) U.S. Cl.
CPC ............ *H04M 1/05* (2013.01); *H04M 1/6058* (2013.01); *H04M 1/7253* (2013.01); *H04R 2460/13* (2013.01)

(58) Field of Classification Search
CPC ........ H04R 1/028; G02C 11/06; G02C 11/10; H04M 1/6041; H04M 1/05; H04M 1/7253
See application file for complete search history.

(56) References Cited

U.S. PATENT DOCUMENTS

| | | | | |
|---|---|---|---|---|
| 1,935,932 A | * | 11/1933 | Benway | H04R 11/00 340/407.1 |
| 1,940,553 A | * | 12/1933 | Hugo | H04R 11/00 381/151 |
| 2,045,404 A | * | 6/1936 | Christ | H04R 17/00 310/329 |
| 2,062,373 A | * | 12/1936 | Christ | H04R 11/00 340/407.1 |
| 2,451,317 A | * | 10/1948 | Blair | H04R 1/14 381/151 |
| 2,613,282 A | * | 10/1952 | Scaife | G02C 11/06 200/52 R |
| 2,813,933 A | * | 11/1957 | Williams | H04R 25/554 381/150 |
| 2,850,584 A | * | 9/1958 | Smith | G02C 11/06 381/326 |
| 3,183,312 A | * | 5/1965 | Jechiel | H04R 25/652 381/326 |
| 4,520,238 A | * | 5/1985 | Ikeda | H04R 1/46 381/151 |
| 6,285,211 B1 | | 9/2001 | Sample et al. | |
| 7,555,136 B2 | * | 6/2009 | Wang | G02C 11/06 381/151 |
| 7,580,540 B2 | * | 8/2009 | Zurek | G06F 3/011 381/151 |
| 8,856,875 B2 | | 10/2014 | Aditya | |
| 9,002,020 B1 | * | 4/2015 | Kim | H04R 17/10 381/56 |
| 9,094,749 B2 | * | 7/2015 | Xie | G10L 25/93 |
| 2003/0228023 A1 | * | 12/2003 | Burnett | G10L 21/0208 381/92 |
| 2005/0286734 A1 | * | 12/2005 | Wang | G02C 11/06 381/381 |
| 2006/0140422 A1 | | 6/2006 | Zurek et al. | |
| 2010/0110368 A1 | * | 5/2010 | Chaum | G02B 27/017 351/158 |
| 2010/0331649 A1 | | 12/2010 | Chou | |
| 2011/0224481 A1 | * | 9/2011 | Lee | G02C 11/06 600/25 |
| 2011/0308323 A1 | | 12/2011 | Oizumi | |
| 2012/0282976 A1 | | 11/2012 | Suhami | |
| 2013/0022220 A1 | * | 1/2013 | Dong | H04R 5/023 381/151 |
| 2013/0159705 A1 | | 6/2013 | Leedom, Jr. | |
| 2013/0242262 A1 | | 9/2013 | Lewis | |
| 2014/0028546 A1 | | 1/2014 | Jeon et al. | |
| 2014/0029762 A1 | * | 1/2014 | Xie | G10L 25/93 381/94.1 |
| 2014/0064536 A1 | * | 3/2014 | Kim | G02B 27/017 381/333 |
| 2014/0112503 A1 | * | 4/2014 | Hebenstreit | H04R 1/00 381/151 |
| 2014/0161287 A1 | * | 6/2014 | Liu | H04R 17/02 381/151 |
| 2014/0275852 A1 | | 9/2014 | Hong et al. | |
| 2014/0297217 A1 | | 10/2014 | Yuen | |
| 2014/0378113 A1 | | 12/2014 | Song et al. | |
| 2015/0031964 A1 | | 1/2015 | Bly et al. | |
| 2015/0074797 A1 | | 3/2015 | Choi et al. | |
| 2015/0135310 A1 | | 5/2015 | Lee | |
| 2015/0160622 A1 | | 6/2015 | Kim et al. | |
| 2015/0185838 A1 | | 7/2015 | Camacho-Perez et al. | |
| 2015/0289820 A1 | | 10/2015 | Miller et al. | |
| 2016/0070245 A1 | | 3/2016 | Lee et al. | |
| 2016/0091980 A1 | | 3/2016 | Baranski et al. | |
| 2016/0246368 A1 | | 8/2016 | Camacho-Perez et al. | |
| 2016/0282945 A1 | | 9/2016 | Ochoa | |
| 2016/0284135 A1 | | 9/2016 | Zamhi | |
| 2016/0378193 A1 | | 12/2016 | Rodrigo | |
| 2017/0078788 A1 | | 3/2017 | Meyer | |
| 2017/0090583 A1 | | 3/2017 | Esquivel et al. | |

FOREIGN PATENT DOCUMENTS

KR  10-2013-0035290 A  4/2013
WO      2015123771 A1  8/2015

OTHER PUBLICATIONS

Carter, et al., "Estimation of the Magnitude-Squared Coherence Function Via Overlapped Fast Fourier Transform Processing", IEEE Transactions on Audio and Electroacoustics, vol. AU-21, No. 4, Aug. 1973.
"Piezoelectric Sound Components", muRata catalogue, May 2014.
Welch, "The Use of Fast Fourier Transform for the Estimation of Power Spectra: A Method Based on Time Averaging Over Short, Modified Periodograms", IEEE Transactions on Audio and Electroacoustics, vol. AU-15, No. 2, Jun. 1967.
International Search Report and Written Opinion issued in PCT Application No. PCT/US2016/061420, dated Jan. 18, 2017, 15 pages.
U.S. Office Action issued in U.S. Appl. No. 14/965,095, dated Oct. 21, 2016.
International Search Report and Written Opinion issued in PCT Application No. PCT/US2016/047089, dated Oct. 6, 2016.
International Search Report issued in PCT Application No. PCT/US2016/047206, dated Oct. 27, 2016, 12 pages.
Tamura, Toshiyo, et al.,: "Wearable Photoplethysmographic Sensors—Past and Present", Electronics, No. 3, 2014, pp. 282-302, DOI:10.3390/electronics3020282, 29 pages.
H. Han, J. Kim, "Artifacts in wearable photoplethysmographs during daily life motions and their reduction with least mean square based active noise cancellation method", Computers in biology and medicine, 42(4), Apr. 2012, pp. 387-393, Abstract only, 2 pages.
K.F. Teng, Y.T. Zhang, "The effect of contacting force on photoplethysmographic signals", Physiological Measurement, No. 25, Aug. 11, 2004, pp. 1323-1335, Abstract only, 3 pages.
G. Park, C.R. Farrar, A. C. Rutherford, A.N. Robertson, "Piezo-Sensor Self-Diagnostics Using Electrical Impedance measurements", Los Alamos National Laboratory, Technical Report LA-UR-04, Oct. 24-27, 2004, 17 pages.
Myo Armband, https://www.thalmic.com/myo, downloaded Mar. 22, 2017, 5 pages.
Chianura, A., et al.: "Electrooptical muscle contraction sensor", Medical & biological engineering & computing, 48(7), pp. 731-734, Jul. 2010, 12 pages.
Raghavendra, J.: "Optomyography: detection of muscle surface displacement using reflective photo resistor", MSc. Thesis, KTH Technology and Health, Stockholm, Aug. 2014, pp. 1-31.
Cheng, E.Y., et al: "Forehead pulse oximetry compared with finger pulse oximetry and arterial blood gas measurement", Journal of Clinical Monitoring, Jul. 4, 1988, vol. 4, Issue 3, pp. 223-226, Abstract only, 2 pages.
Barry, D.T., et al: "Acoustic myography as a control signal for an externally powered prosthesis", Archives of Physical Medicine and Rehabilitation, vol. 67, No. 4, Apr. 1986, pp. 267-269, Abstract only, 2 pages.

(56) References Cited

OTHER PUBLICATIONS

Overly, T.G., et al: "Piezoelectric active-sensor diagnostics and validation using instantaneous baseline data", IEEE Sensors Journal, vol. 9, No. 11, Nov. 2009, pp. 1414-1421, Abstract only, 1 page.
Lim, J. M., et al: "Recognizing hand gestures using wrist shapes". In Consumer Electronics (ICCE), 2010 Digest of Technical Papers International Conference, IEEE, Jan. 2010, pp. 197-198, Abstract only, 1 page.
Alian, A. A., et al: "Photoplethysmography". Best Practice & Research Clinical Anaesthesiology, 28(4), Dec. 2014, pp. 395-406, Abstract only, 2 pages.
Mason, W.P., et al.: "Methods for Measuring Piezoelectric, Elastic, and Dielectric Coefficients of Crystals and Ceramics", Proceedings of the IRE,vol. 42, Jun. 6, 1954, 1 page, Abstract only, 1 page.
Harrison, Chris, et al.: "Skinput: Appropriating the Body as an Input Surface", http://www.chrisharrison.net/index.php/Research/Skinput, downloaded Mar. 22, 2017, 10 pages.
Final Office Action issued in U.S. Appl. No. 14/965,095, dated May 2, 2017, 21 pages.
Final Office Action issued in U.S. Appl. No. 14/855,746, dated Sep. 13, 2017, 49 pages.

* cited by examiner

SYSTEM FOR VOICE CAPTURE VIA NASAL VIBRATION SENSING

TECHNICAL FIELD

The present disclosure relates to electronic communication, and more particularly, to a system for capturing the voice of a user based on sensors configured to sense nasal resonation.

BACKGROUND

Electronic communication has become an integral part of modern society. For example, people may rely on mobile communications for business and/or personal interaction, to conduct financial transactions, to query for a variety of different data, for location-related assistance, to play games or watch multimedia presentations, etc. The expansion of various wireless networks such as global-area networks (GANs), wide-area networks (WANs) like the Internet, local-area networks (LANs), personal-area networks (PANs), etc., has further facilitated users in being able to perform even more activities on their mobile device in even more locations. Now users may be able to make calls, access the Internet, execute financial transactions, etc. while operating a motor vehicle, riding on public transportation, at work, at school, at home, at a public event, etc.

While the benefits of the above are readily apparent, possibly negative consequences may also exist. There are currently active campaigns against utilizing mobile devices while operating a motor vehicle. The operation of a mobile device when driving may divert the driver's attention away from the road and cause accidents. Moreover, it can be difficult to operate a mobile device at public events due to environmental noise. These problematic situations may be alleviated by the advent of "hands free" peripheral equipment. Hands free peripheral equipment may provide interfaces over which a user may interact with a mobile device that remains stored, in a charger, etc. This interaction may take place over a wired or wireless communication link. Examples of hands free peripheral equipment may include, but are not limited to, speakerphones, headsets, microphones, remote controls, etc. While these devices may be helpful, they are not all-purpose fixes. For example, headsets may facilitate hands-free communication, but may also experience problems in certain noisy situations. Wearing a headset also requires a user to maintain another device that they would not normally wear unless hands-free operations was desired or required, and in some regions wearing a headset (e.g., earpiece) may have negative stylistic implications.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
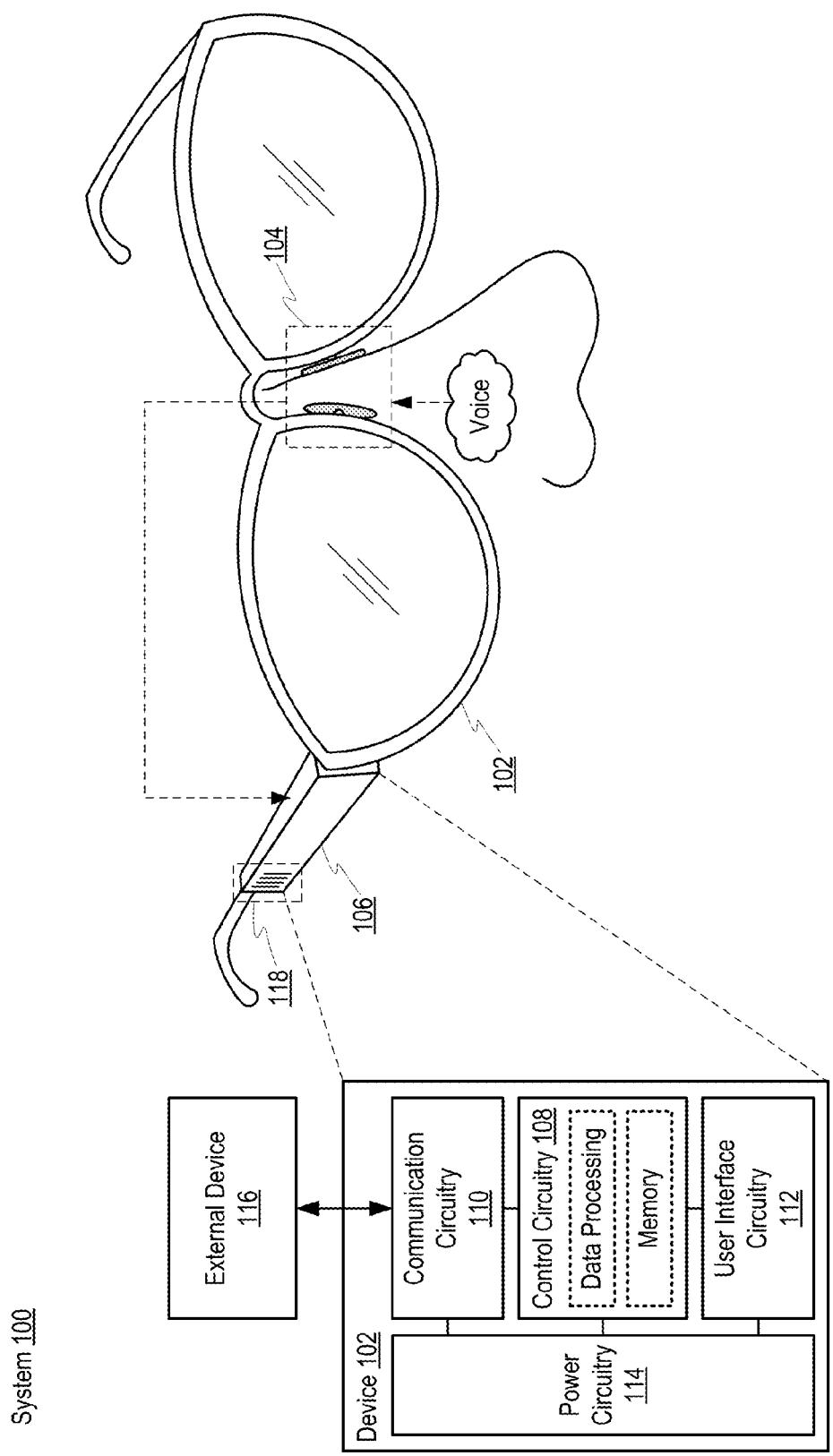
FIG. 1 illustrates an example system for voice capture via nasal vibration sensing in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure pertains to a system for voice capture via nasal vibration sensing. A system worn by a user may be able to sense vibrations through the nose of the user when the user speaks, generate an electronic signal based on the sensed vibration and generate voice data based on the electronic signal. In this manner, the system may capture a user's voice for use in, for example, dictation, telephonic communications, etc., while also screening out external noise (e.g., based on the natural sound dampening properties of the human skull). An example system may include a wearable frame (e.g., an eyeglass frame) on which is mounted at least one sensor and a device. The at least one sensor may sense vibration in the nose of a user and may generate the electronic signal based on the vibration. The device may receive the electronic signal from the at least one sensor and may generate voice data based on the electronic signal. Other features may include, for example, compensation for situations where vibration cannot be sensed, sound generation based on received audio data for use in, for example, telephonic communications, etc.

In at least one embodiment, an example system to capture a voice of a user may comprise at least a frame, at least one sensor mounted to the frame and a device mounted to the frame. The frame may be wearable by a user. The at least one sensor may be to generate an electronic signal based on vibration sensed in a nose of the user when the user talks. The device may be to at least receive the electronic signal from the at least one sensor and process the electronic signal to generate voice data.

The frame may be for eyeglasses. In this example implementation the at least one sensor may be incorporated within at least one nosepiece for the eyeglasses. It may also be possible for two sensors to be embedded in two sides of the nosepiece. For example, the two sensors may be coupled in series and the device is to receive a combined electronic signal generated by the two sensors. Alternatively, the device may be to select to process the electronic signal generated from one of the two sensors.

The at least one sensor may comprise a piezoelectric diaphragm to generate the electronic signal. The device may comprise at least control circuitry to generate the voice data from the electronic signal. The control circuitry may also be to determine whether the voice data includes a local command, and if determined to include a local command, perform at least one activity based on the local command. The device may also comprise at least communication circuitry to transmit the voice data to an external device and at least user interface circuitry to allow the user to interact with the system. In at least one embodiment, the user interface circuitry is to generate sound based on audio data received from the external device via the communication circuitry. Consistent with the present disclosure, an example method for capturing voice data from a user may comprise activating sensing for nasal vibration in a wearable system, sensing nasal vibration with at least one sensor in the wearable system, generating an electronic signal based on the nasal vibration and generating voice data based on the electronic signal.

FIG. 1 illustrates an example system 100 for voice capture via nasal vibration sensing in accordance with at least one embodiment of the present disclosure. While examples of specific implementations (e.g., in eyeglasses) and/or technologies (e.g., piezoelectric sensors, Bluetooth wireless communications, etc.) will be employed herein, these examples are presented merely to provide a readily comprehensible perspective from which the more generalized devices, systems, methods, etc. taught herein may be understood. Other applications, configurations, technologies, etc. may result in implementations that remain consistent with the teachings presented herein.

System 100 may comprise a frame 102 on which at least one sensor 104 (e.g., hereafter, "sensor 104") and device 106 may be mounted. "Mounting" may include sensor 104 and device 106 being attached to frame 102 via mechanical attachment (e.g., screw, nail or other fastener), adhesive attachment (e.g., a glue, epoxy, etc.) or being incorporated within the structure of frame 102. Frame 102 is disclosed as a pair of eyeglasses only for the sake of explanation. Eyeglasses make an appropriate foundation on which various features consistent with the present disclosure may be implemented. Moreover, since eyeglasses, sunglasses, safety glasses, etc. are already routinely worn by people, it also means that there is little barrier to adoption of the technology. Users are not required to wear or carry additional equipment dedicated only to voice capture. Notwithstanding the foregoing advantages offered by eyeglasses of the types mentioned above, the teachings disclosed herein may alternatively be embodied in different form factors including, for example, any structure that touches, or is at least in proximity to, the nose and may be able to act as a platform for the variety of systems, devices, components, etc. that are described herein.

Sensor 104 may comprise vibration sensing circuitry. In at least one embodiment, the sensing circuitry may comprise, for example, piezoelectric components such as a diaphragm. Piezoelectric diaphragms may convert vibration (e.g., mechanical pressure waves) into electronic signals. Consistent with the present disclosure, the vibration sensing circuitry in sensor 104 may be in contact with, or at least proximate to, the nose of a user wearing frame 102. For example, the bridge of the user's nose is bone, and may resonate when the user speaks. Sensor 104 may be able to detect the vibration caused by the nasal bones resonating with the user's voice, and may convert the sensed vibration into an electronic signal that is then provided to device 106.

Device 106 may be configured to perform activities in system 100 such as, for example, generating voice data from the electronic signal generated by sensor 104, transmitting the voice data to external device 116, receiving audio data from external device 116, generating sound based on the received audio data, identifying and processing local commands, etc. Device 106 may comprise, for example, control circuitry 108, communication circuitry 110, user interface 112 and power circuitry 114. Control circuitry 108 may comprise at least data processing and memory resources. Data processing resources may include, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various x86-based microprocessors available from the Intel Corporation including those in the Pentium®, Xeon®, Itanium®, Celeron®, Atom®, Quark®, Core i-series, product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which the data processing resources may interact with other system components that may be operating at different speeds, on different buses, etc. in device 106. Some or all of the functionality commonly associated with the support circuitry may also be included in the same physical package as the processor (e.g., such as in the Sandy Bridge family of processors available from the Intel Corporation).

The data processing resources may be configured to execute various instructions in device 106. Instructions may include program code configured to cause the data processing resources to perform activities related to reading data, writing data, processing data, formulating data, converting data, transforming data, etc. Information (e.g., instructions, data, etc.) may be stored in the memory resources. The memory resources may comprise random access memory (RAM) or read-only memory (ROM) in a fixed or removable format. RAM may include volatile memory configured to hold information during the operation of device 106 such as, for example, static RAM (SRAM) or Dynamic RAM (DRAM). ROM may include non-volatile (NV) memory circuitry configured based on BIOS, UEFI, etc. to provide instructions when device 106 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Communication circuitry 110 may manage communications-related operations for device 106, which may include resources configured to support wired and/or wireless communications. Device 106 may comprise multiple sets of communication circuitry 110 (e.g., including separate physical interface circuitry for wired protocols and/or wireless radios). Wired communications may include serial and parallel wired mediums such as, for example, Ethernet, Universal Serial Bus (USB), Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communications, satellite-based communications, etc.), electronic communications via sound waves, etc. In one embodiment, communication circuitry 110 may be configured to prevent wireless communications from interfering with each other. In performing this function, communication circuitry 110 may schedule communication activities based on, for example, the relative priority of messages awaiting transmission.

User interface circuitry 112 may include hardware and/or software to allow users to interact with device 106 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 112 may be incorporated within device 106 and/or may be coupled to device 106 via a wired or wireless communication medium. Power circuitry 114 may include internal power sources (e.g., battery, fuel cell, etc.) and/or external power sources (e.g., power grid, electromechanical or solar generator, external fuel cell, etc.) and related circuitry configured to supply device 106 with the power needed to operate.

External device 116 may include equipment that is at least able to process the voice data generated by device 106. Examples of external device 116 may include, but are not limited to, a mobile communication device such as a cellular handset or a smartphone based on the Android® OS from the Google Corporation, iOS® or Mac OS® from the Apple Corporation, Windows® OS from the Microsoft Corporation, Linux® OS, Tizen® OS and/or other similar operating systems that may be deemed derivatives of Linux® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, Apple Watch® from the Apple Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc. or combinations thereof.

In an example of operation, system 100 may be worn by a user and activated manually by user interaction with user interface circuitry 112, or automatically by the user activating external device 116, activating an application on external device 116, speaking a local command, etc. In speaking a local command, device 106 may be in a power conservation mode and the speaking of a certain sound, word, phrase, etc. may be recognized by device 106 (e.g., in electronic signal form or after converted to voice data) as a local command to activate system 100 (e.g., transition device 106 from the power conservation mode to an active mode). Other local commands may, for example, deactivate system 100, mute system 100 (e.g., temporarily stop sensing operations or transmission operations), increase or decrease speaker volume, etc. Following the activation of system 100, sensor 104 may sense vibration in the nose of the user (e.g., the bony bridge of the user's nose), and may generate an electronic signal based on the vibration. The electronic signal may be received by device 106, which may generate voice data based on the electronic signal. For example, control circuitry 108 may convert the analog electronic signal into digital voice data. The next operation depends on the situation in which system 100 is being utilized. For example, if simple dictation is occurring then control circuitry 108 may store the voice data in memory for later retrieval. If engaged in a telephone call then communication circuitry 110 may transmit the voice data to external device 116 (e.g., a mobile communication device) and may receive audio data from external device 116 pertaining to the other party in the call. User interface circuitry 112 may then generate sound via, for example, speaker 118 so that the user may interact with the other caller. In at least one embodiment, the sound of the user's own voice may be generated through speaker 118 to provide auditory feedback to the user of system 100.

Figure 2:
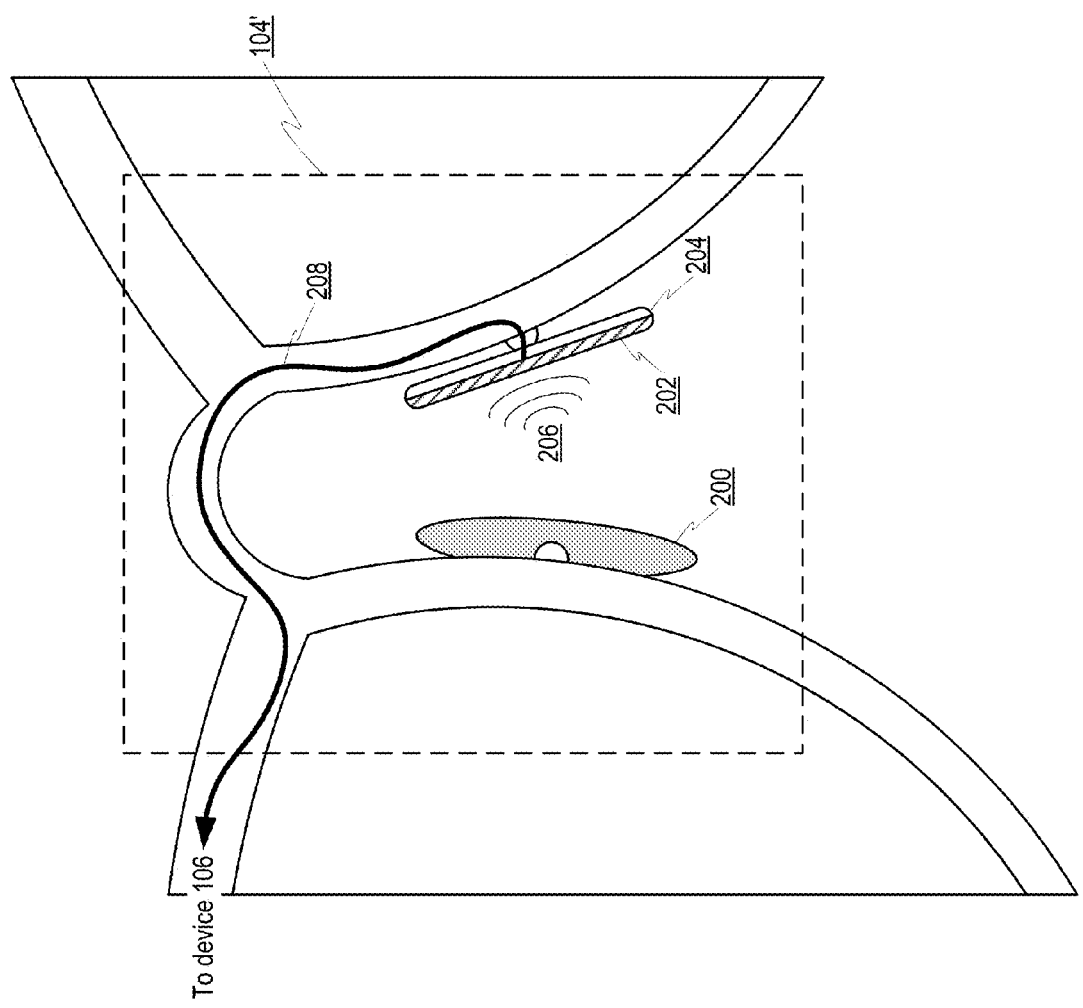
FIG. 2 illustrates an example configuration for a sensor in accordance with at least one embodiment of the present disclosure.

FIG. 2 illustrates an example configuration for sensor 104' in accordance with at least one embodiment of the present disclosure. FIG. 2 shows sensor 104' within a nosepiece 200. Nosepiece 200 may comprise, for example, at least sensing circuitry 202 affixed to structural support 204. Sensing circuitry 202 may include, for example, a piezoelectric diaphragm to convert vibration 206 into an electronic signal. Vibration 206 may occur due to cranial bones resonating from a user talking. This effect has dual benefits in that it allows the user's voice to be captured while also screening out external noise based on the human skulls natural ability to dampen external noise. The use of piezoelectric diaphragms is beneficial in that they are able to accurately generate an electronic signal indicative of voice and do not require external power (e.g., the pressure waves may compress a piezoelectric crystal to generate the electronic signal).

While wire 208 is shown in FIG. 2 to convey the electronic signal to device 106, the use of wireless communication is also possible to transmit the electronic signal. A variety of sensor configurations may be implemented consistent with the present disclosure. For example, given that two nosepieces 200 exist in a common pair of glasses, at least one of the two nosepieces 200 may include sensor 104'. In another example implementation, both nosepieces 200 may include sensor 104'. The sensors 104' in each nosepiece 200 may be wired in series to generate stronger electronic signals. In another embodiment, the sensors 104' in each nosepiece 200 may be wired individually, and resources in device 106 (e.g., control circuitry 108) may then select the sensor 104' to employ based on the strength of the electronic signals received from each sensor 104'. In this manner, system 100 may be able to account for the particularities in each user's nasal bones (e.g., breaks, natural deformities such as a deviated septum, etc.) and select the particular sensor 104' that may provide the strongest and cleanest electronic signal to use in generating voice data.

Figure 3:
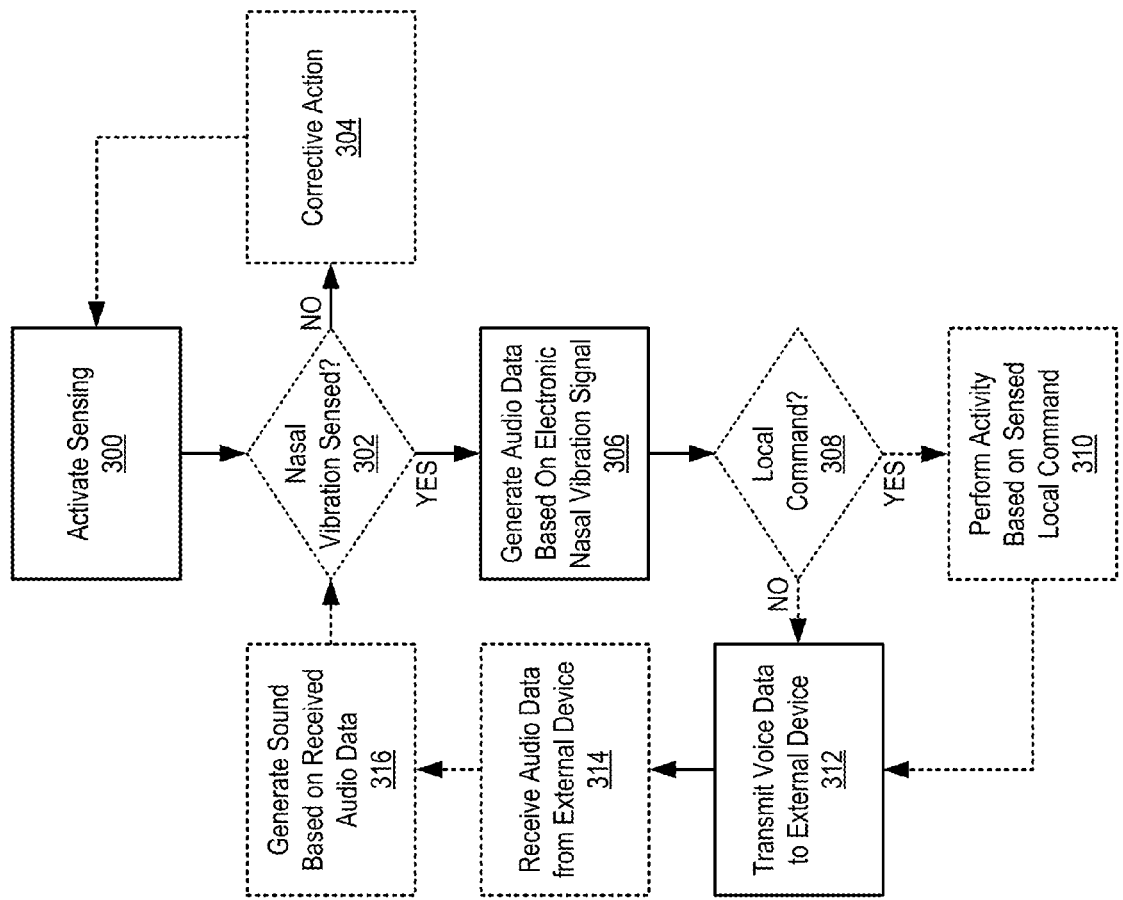
FIG. 3 illustrates example operations for voice capture via nasal vibration sensing in accordance with at least one embodiment of the present disclosure.

FIG. 3 illustrates example operations for voice capture via nasal vibration sensing in accordance with at least one embodiment of the present disclosure. Operations in FIG. 3 shown with a dotted outline may be optional based on the particulars of an implementation including, for example, the capabilities of the system (e.g., of the sensors, devices, etc. within the system), the configuration of the system, the use for which the system is intended, etc. In operation 300, nasal vibration sensing may be activated. Activation may be manual (e.g. instigated by a user of the system) or automatic (e.g., triggered by external device activity, local commands, etc.). A determination may be made in operation 302 as to whether nasal vibration is sensed by at least one sensor in the system. If in operation 302 it is determined that nasal vibration is not sensed, then in operation 304 at least one corrective action may occur. Examples of correction action may include generating an audible, visible and/or tactile notification to the user, reinitiating the system as illustrated by the arrow leading back to operation 300, the selection of another sensor in the system (e.g., when the system is eyeglasses, of a sensor in the opposite nosepiece), etc.

If in operation 302 it is determined that nasal vibration is sensed, then in operation 306 voice data may be generated based on an electronic signal generated by the at least one sensor. A determination may be made in operation 308 as to whether the electronic signal and/or voice data included a local command. For example, a set of local commands may be configured in the system, and control circuitry in the system may compare the electronic signal and/or voice data to the set of local commands to determine if a match exists. If in operation 308 it is determined that a local command was received, then in operation 310 at least one activity may be executed based on the sensed local command. Examples of activities that may be performed include, but are not limited to, turning on/off the system, adjusting system volumes, temporarily disabling voice capture and/or voice data transmission, etc. A determination in operation 308 that a local command was not received may be followed by transmitting the voice data to the external device (e.g., a mobile communication device like smartphone) in operation 312. In operation 314, audio data (e.g., voice data corresponding to other participants in a telephone call) may be received from the external device. Sound may be generated based on the received audio data in operation 316, which may be followed by a return to operation 302 to continue nasal vibration sensing.

While FIG. 3 illustrates operations according to an embodiment, it is to be understood that not all of the operations depicted in FIG. 3 are necessary for other embodiments. Indeed, it is fully contemplated herein that in other embodiments of the present disclosure, the operations depicted in FIG. 3, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure pertains to a system for voice capture via nasal vibration sensing. A system worn by a user may be able to sense vibrations through the nose of the user when the user speaks, generate an electronic signal based on the sensed vibration and generate voice data based on the electronic signal. In this manner, the system may capture a user's voice while also screening out external noise (e.g., based on the sound dampening properties of the human skull). An example system may include a wearable frame (e.g., eyeglass frame) on which is mounted at least one sensor and a device. The at least one sensor may sense vibration in the nose of a user and may generate the electronic signal based on the vibration. The device may receive the electronic signal from the at least one sensor and may generate voice data based on the electronic signal.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for voice capture via nasal vibration sensing, as provided below.

According to example 1 there is provided a system to capture a voice of a user. The system may comprise a frame wearable by a user, at least one sensor mounted to the frame, wherein the at least one sensor is to generate an electronic signal based on vibration sensed in a nose of the user when the user talks and a device mounted to the frame, wherein the device is to at least receive the electronic signal from the at least one sensor and process the electronic signal to generate voice data.

Example 2 may include the elements of example 1, wherein the frame is for eyeglasses.

Example 3 may include the elements of example 2, wherein the at least one sensor is incorporated within at least one nosepiece for the eyeglasses.

Example 4 may include the elements of example 3, wherein the at least one nosepiece comprises at least sensing circuitry and structural support.

Example 5 may include the elements of any of examples 3 to 4, wherein two sensors are embedded in two sides of the nosepiece.

Example 6 may include the elements of example 5, wherein the two sensors are coupled in series and the device is to receive a combined electronic signal generated by the two sensors.

Example 7 may include the elements of any of examples 5 to 6, wherein the device is to select to process the electronic signal generated from one of the two sensors.

Example 8 may include the elements of any of examples 1 to 7, wherein the at least one sensor comprises a piezo-electric diaphragm to generate the electronic signal.

Example 9 may include the elements of any of examples 1 to 8, wherein the device comprises at least control circuitry to generate the voice data from the electronic signal.

Example 10 may include the elements of example 9, wherein the control circuitry is to determine whether the voice data includes a local command, and if determined to include a local command, perform at least one activity based on the local command.

Example 11 may include the elements of any of examples 1 to 10, wherein the device comprises at least communication circuitry to transmit the voice data to an external device.

Example 12 may include the elements of example 11, wherein the device is coupled to the external device via a wireless communication link.

Example 13 may include the elements of any of examples 11 to 12, wherein the device comprises at least user interface circuitry to allow the user to interact with the system.

Example 14 may include the elements of example 13, wherein the user interface circuitry is to generate sound based on audio data received from the external device via the communication circuitry.

Example 15 may include the elements of any of examples 1 to 14, wherein the at least one sensor is coupled to the device via a wire.

Example 16 may include the elements of any of examples 1 to 15, wherein the at least one sensor is coupled to the device via a wireless communication link.

Example 17 may include the elements of any of examples 1 to 16, wherein the frame is for eyeglasses and the at least one sensor is incorporated within at least one nosepiece for the eyeglasses.

Example 18 may include the elements of any of examples 1 to 17, wherein the device comprises at least control circuitry to at least one of generate the voice data from the electronic signal, determine whether the voice data includes a local command, and if determined to include a local command, perform at least one activity based on the local command.

According to example 19 there is provided a method for capturing voice data from a user. The method may comprise activating sensing for nasal vibration in a wearable system, sensing nasal vibration with at least one sensor in the wearable system, generating an electronic signal based on the nasal vibration and generating voice data based on the electronic signal.

Example 20 may include the elements of example 19, and may further comprise determining whether nasal vibration has been sensed and performing corrective action if no nasal vibration has been sensed.

Example 21 may include the elements of example 20, wherein performing corrective action comprises at least one of reinitiating the wearable system or sensing with another sensor in the wearable system.

Example 22 may include the elements of any of examples 19 to 21, and may further comprise determining whether the voice data comprises a local command and performing at least one activity based on a determination that the voice data comprises at least one local command.

Example 23 may include the elements of any of examples 19 to 22, and may further comprise generating sound based on audio data received in the wearable system.

According to example 24 there is provided a system for capturing voice data including at least one device, the system being arranged to perform the method of any of the above examples 19 to 23.

According to example 25 there is provided a chipset arranged to perform the method of any of the above examples 19 to 23.

According to example 26 there is provided at least one machine readable medium comprising a plurality of instructions that, in response to be being executed on a computing device, cause the computing device to carry out the method according to any of the above examples 19 to 23.

According to example 27 there is provided at least one device configured for capturing voice data, the device being arranged to perform the method of any of the above examples 19 to 23.

According to example 28 there is provided a system for capturing voice data. The system may comprise means for activating sensing for nasal vibration in a wearable system, means for sensing nasal vibration with at least one sensor in the wearable system, means for generating an electronic signal based on the nasal vibration and means for generating voice data based on the electronic signal.

Example 29 may include the elements of example 28, and may further comprise means for determining whether nasal vibration has been sensed and means for performing corrective action if no nasal vibration has been sensed.

Example 30 may include the elements of example 29, wherein the means for performing corrective action comprise means for at least one of reinitiating the wearable system or sensing with another sensor in the wearable system.

Example 31 may include the elements of any of examples 28 to 30, and may further comprise means for determining whether the voice data comprises a local command and means for performing at least one activity based on a determination that the voice data comprises at least one local command.

Example 32 may include the elements of any of examples 28 to 31, and may further comprise means for generating sound based on audio data received in the wearable system.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system to capture a voice of a user, comprising:
an eyeglass frame including a nosepiece wearable by a user;
a first sensor embedded in a first portion of the nosepiece and a second sensor embedded in a second portion of the nosepiece, wherein the first sensor and the second sensor each generate a respective first electronic signal and second electronic signal based on vibration sensed in a nose of the user when the user talks; and control circuitry mounted to the frame to:
  receive the first electronic signal from the first sensor and the second electronic signal from the second sensor; and
  select either the first electronic signal or the second electronic signal based at least in part on one or more particularities of the user's nasal bones to generate voice data.

2. The system of claim 1, wherein the first sensor and the second sensor each include a piezoelectric diaphragm to generate the electronic signal.

3. The system of claim 1, wherein the control circuitry is to determine whether the voice data includes a local command, and if determined to include a local command, perform at least one activity based on the local command.

4. The system of claim 1, wherein the device comprises at least communication circuitry to transmit the voice data to an external device.

5. The system of claim 4, wherein the device comprises at least user interface circuitry to allow the user to interact with the system.

6. The system of claim 5, wherein the user interface circuitry is to generate sound based on audio data received from the external device via the communication circuitry.

7. A method for capturing voice data from a user, comprising:
  activating sensing for nasal vibration in an eyeglass system that includes a nosepiece;
  sensing nasal vibration with a first sensor embedded in a first portion of the nosepiece and a second sensor embedded in a second portion of the nosepiece;
  generating a first electronic signal using the first sensor and a second electronic signal using the second sensor, the first electronic signal and the second electronic signal based on the nasal vibration;
  selecting either the first electronic signal or the second electronic signal based at least in part on one or more peculiarities of a user's nasal bones; and
  generating voice data based on the selected electronic signal.

8. The method of claim 7, further comprising:
  determining whether nasal vibration has been sensed; and
  performing corrective action if no nasal vibration has been sensed.

9. The method of claim 8, wherein performing corrective action comprises at least one of reinitiating the wearable system or sensing with another sensor in the wearable system.

10. The method of claim 7, further comprising:
  determining whether the voice data comprises a local command; and
  performing at least one activity based on a determination that the voice data comprises at least one local command.

11. The method of claim 7, further comprising:
  generating sound based on audio data received in the wearable system.

12. At least one machine-readable storage device having stored thereon, individually or in combination, instructions for capturing voice data from a user that, when executed by one or more processors, cause the one or more processors to:
  activate sensing for nasal vibration in an eyeglass system that includes a nosepiece;
  sense nasal vibration with a first sensor embedded in a first portion of the nosepiece and a second sensor embedded in a second portion of the nosepiece;
  receive a first electronic signal from the first sensor and a second electronic signal from the second sensor, the first electronic signal and the second electronic signal based on the nasal vibration;
  select either the first electronic signal or the second electronic signal based at least in part on one or more peculiarities of a user's nasal bones; and
  generate voice data based on the selected electronic signal.

13. The storage device of claim 12, further comprising instructions that, when executed by one or more processors, cause the one or more processors to:
  determine whether nasal vibration has been sensed; and
  perform corrective action if no nasal vibration has been sensed.

14. The storage device of claim 13, wherein the instructions to perform corrective action comprise instructions to at least one of reinitiate the wearable system or sense with another sensor in the wearable system.

15. The storage device of claim 12, further comprising instructions that, when executed by one or more processors, cause the one or more processors to:
  determine whether the voice data comprises a local command; and
  perform at least one activity based on a determination that the voice data comprises at least one local command.

16. The storage device of claim 12, further comprising instructions that, when executed by one or more processors, cause the one or more processors to:
  generate sound based on audio data received in the wearable system.

* * * * *